(12) United States Patent
Oblak et al.

(10) Patent No.: US 10,250,812 B2
(45) Date of Patent: Apr. 2, 2019

(54) DISPLAY SYSTEM FOR MACHINE

(71) Applicant: Caterpillar Inc., Peoria, IL (US)

(72) Inventors: Tod A. Oblak, Pittsburgh, PA (US); Lawrence A. Mianzo, Pittsburgh, PA (US); Jeffrey T. Stringer, Pittsburgh, PA (US)

(73) Assignee: Caterpillar Inc., Deerfield, IL (US)

( * ) Notice: Subject to any disclaimer, the term of this patent is extended or adjusted under 35 U.S.C. 154(b) by 79 days.

(21) Appl. No.: 15/597,316

(22) Filed: May 17, 2017

(65) Prior Publication Data

US 2018/0338087 A1 Nov. 22, 2018

(51) Int. Cl.
*E02F 3/32* (2006.01)
*G06K 9/00* (2006.01)
*H04N 7/18* (2006.01)
*H04N 5/232* (2006.01)
*G06F 3/0488* (2013.01)
*E02F 9/02* (2006.01)
*E02F 3/40* (2006.01)
*E02F 3/38* (2006.01)
*E02F 9/18* (2006.01)

(52) U.S. Cl.
CPC .......... *H04N 5/23293* (2013.01); *E02F 3/32* (2013.01); *G06F 3/0488* (2013.01); *G06K 9/00805* (2013.01); *H04N 7/181* (2013.01); *E02F 3/38* (2013.01); *E02F 3/401* (2013.01); *E02F 9/024* (2013.01); *E02F 9/18* (2013.01)

(58) Field of Classification Search
CPC ............... H04N 5/23293; H04N 7/181; G06K 9/00805; G06F 3/0488; E02F 3/32; E02F 9/18; E02F 3/38; E02F 3/401; E02F 9/024
See application file for complete search history.

(56) References Cited

U.S. PATENT DOCUMENTS

| 6,923,080 B1 | 8/2005 | Günter et al. |
| 7,227,569 B2 | 6/2007 | Maruya |
| 7,557,825 B2 | 7/2009 | Mie et al. |
| 7,787,013 B2 | 8/2010 | Atsushi et al. |

(Continued)

FOREIGN PATENT DOCUMENTS

CN 105025099 11/2015

*Primary Examiner* — Timothy J Henn
(74) *Attorney, Agent, or Firm* — Harrity & Harrity

(57) ABSTRACT

A display system for displaying image data of an environment of a machine includes a display screen and a plurality of imaging devices communicably coupled to the display screen. Each of the plurality of imaging devices generates image data of the environment of the machine and has an associated operating parameter. The plurality of imaging devices stores the image data in an uncompressed form. The plurality of imaging devices compresses the image data and generates signals indicative of the compressed image data. The plurality of imaging devices receives the operating parameter associated with at least one another imaging device. The plurality of imaging devices transmits the compressed image data to the display screen based on the associated operating parameter and the received parameter of the at least one another imaging device. The plurality of imaging devices displays an image on the display screen based on the transmitted image data.

20 Claims, 9 Drawing Sheets

(56) References Cited

U.S. PATENT DOCUMENTS

| | | | |
|---|---|---|---|
| 8,711,238 B2* | 4/2014 | Crook | H04N 5/247 |
| | | | 348/211.3 |
| 2002/0118286 A1* | 8/2002 | Kanade | H04N 5/222 |
| | | | 348/222.1 |
| 2006/0056056 A1* | 3/2006 | Ahiska | G08B 13/19608 |
| | | | 359/690 |
| 2009/0055205 A1 | 2/2009 | Binh et al. | |
| 2009/0309973 A1 | 12/2009 | Kogane | |
| 2012/0147191 A1 | 6/2012 | Snoussi | |
| 2014/0327774 A1* | 11/2014 | Lu | G06K 9/00791 |
| | | | 348/148 |
| 2016/0217331 A1 | 7/2016 | Yoichi et al. | |
| 2016/0301864 A1* | 10/2016 | Petrany | H04N 5/23238 |
| 2017/0217737 A1* | 8/2017 | Rudy | G06T 7/246 |
| 2017/0223269 A1* | 8/2017 | Fluegel | H04N 5/23238 |
| 2018/0044893 A1* | 2/2018 | Machida | B60R 1/00 |
| 2018/0070009 A1* | 3/2018 | Baek | H04N 5/2353 |
| 2018/0091741 A1* | 3/2018 | Ida | G06K 9/00711 |

* cited by examiner

DISPLAY SYSTEM FOR MACHINE

TECHNICAL FIELD

The present disclosure relates to a display system for a machine. More specifically, the present disclosure relates to the display system for displaying image data of an environment of the machine.

BACKGROUND

A machine, such as a hydraulic excavator, is a self-propelled construction machine designed for conducting work, such as excavating. The hydraulic excavator may include an upper swiveling body installed on a base having a crawler or wheel carriage. A self-propelled working machine, such as the hydraulic excavator, may be provided with a surveillance mechanism for surveying around the upper swiveling body in order to ensure the safety for working and to improve the operability of the machine is known. This surveillance mechanism may be constituted by one or more cameras attached to the upper swiveling body and a display screen installed at a position in front of an operator's seat at an operator station. Images taken by the camera may be displayed on the display screen.

In order to maximize safety while operating the machine, the plurality of cameras may be configured to obtain a widest possible viewing angle around the working machine. The plurality of cameras may generate image data corresponding to the surround-view and communicate those images to the display. However, since the plurality of cameras is installed, the image data may need to be sent to an electronic control unit (ECU) over a data link of the machine. The ECU then combines images from the plurality of cameras to provide a complete view of the environment around the machine. The above system inherently requires an expensive ECU with abundance of processing power and memory. Further, image data is compressed to communicate volumes of image data from the plurality of cameras to the ECU as the capacity of data link is limited due to system design requirements, reducing overall image quality affecting tracking of people and objects around the machine.

U.S. Pat. No. 7,787,013 (hereinafter referred to as '013 reference) describes a monitor system with plurality of cameras. The '013 reference includes a method for monitoring a monitoring area wherein each of the plurality of cameras capture an image of an image capturing area. The method includes changing an image capturing area of each of the plurality of imaging devices based on an image capturing characteristics information so as to form a gapless wide range image. However, the '013 reference does not disclose details about any solution to prevent increase in overall cost of the machine or reduction of overall image quality.

Therefore, an improved display system for displaying image data of the environment of the machine is required.

SUMMARY

In an aspect of the present disclosure, a display system for displaying image data of an environment of a machine is provided. The display system includes a display screen and a plurality of imaging devices communicably coupled to each other and the display screen. Each of the plurality of imaging devices has an associated operating parameter. Each of the plurality of imaging devices generates the image data of the environment of the machine. Each of the plurality of imaging devices stores the image data in an uncompressed form. The plurality of imaging devices compresses the image data and generates signals indicative of the compressed image data. The plurality of imaging devices receives an operating parameter associated with at least one another imaging device from the plurality of imaging devices. The plurality of imaging devices transmits the compressed image data to the display screen based on the associated operating parameter, and the received operating parameter of the at least one another imaging device. The plurality of imaging devices display an image on the display screen based on the transmitted image data.

In another aspect of the present disclosure, a method of displaying image data of an environment of a machine is disclosed. The machine includes a display screen and a plurality of imaging devices communicably coupled to the display screen. The method includes generating the image data of the environment of the machine by the plurality of imaging devices. Each of the plurality of imaging devices has an associated operating parameter. The method includes receiving an operating parameter associated with at least one another imaging device from the plurality of imaging devices. The method also includes transmitting the image data to the display screen based on the associated operating parameter and the received operating parameter of the at least one another imaging device. The method further includes displaying an image on the display screen based on the transmitted image data by the plurality of imaging devices.

In yet another aspect of the present disclosure, a machine including an imaging device is disclosed. The imaging device generates image data of an environment of the machine. The imaging device stores the image data in an uncompressed form. The imaging device compresses the image data and generates signals indicative of the compressed image data. The imaging device transmits signals indicative of the compressed image data based on the associated operating parameter, and the received operating parameter of the at least one another imaging device. The machine further includes a display screen communicably coupled to the plurality of imaging devices. The display screen receives the signals indicative of the compressed image data transmitted by the plurality of imaging devices and displays an image on the display screen based on the signals indicative of the compressed image data.

DETAILED DESCRIPTION

Figure 1:
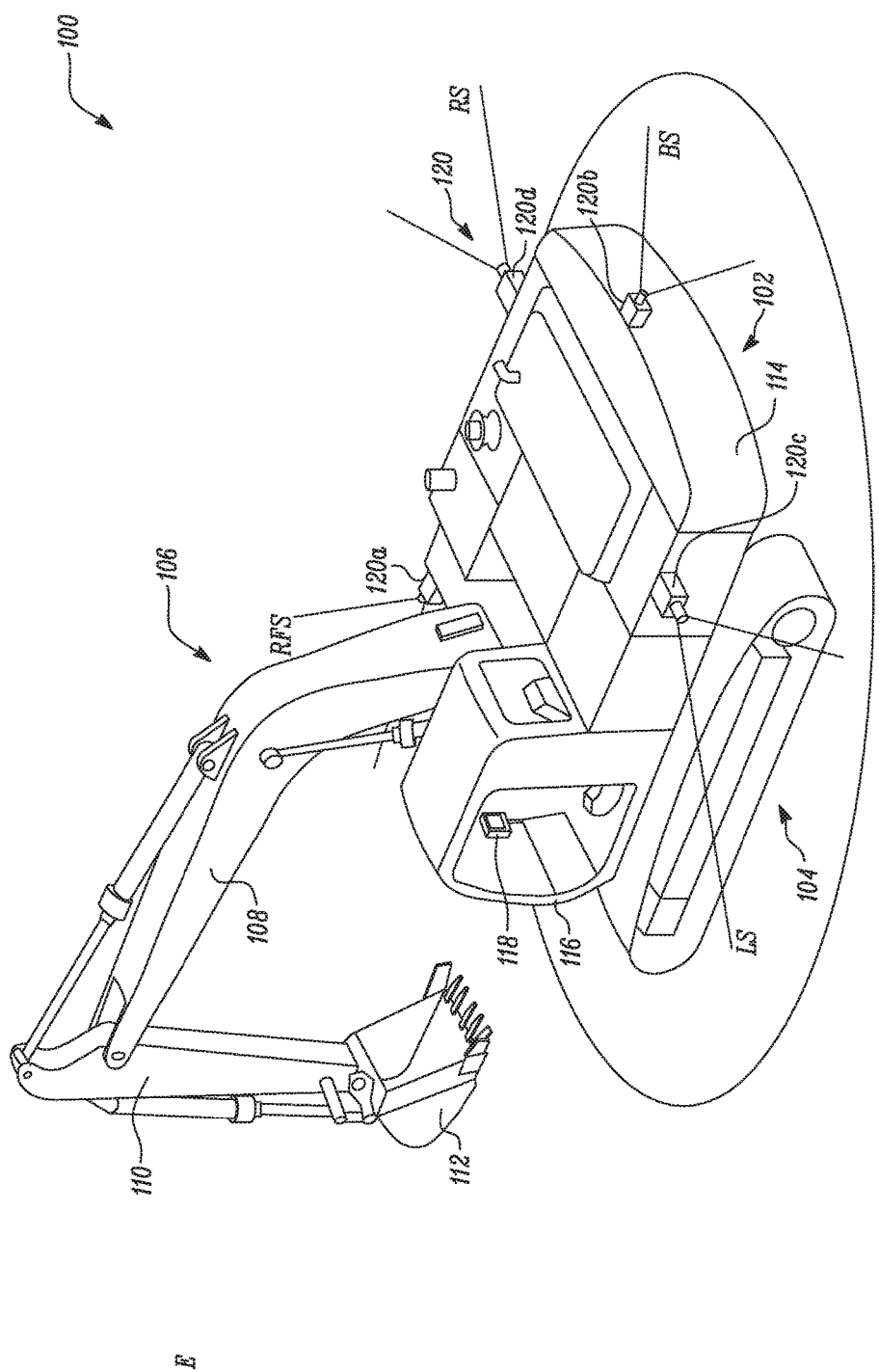
FIG. 1 is a perspective view of a machine having a display system, in accordance with an embodiment of the present disclosure.

Wherever possible, the same reference numbers will be used throughout the drawings to refer to same or like parts. FIG. 1 shows an exemplary machine 100. The machine 100 is illustrated as a hydraulic excavator which may be used, for example, for construction and other allied industries. While the following detailed description describes an exemplary aspect in connection with the hydraulic excavator, it should be appreciated that the description applies equally to the use of the present disclosure in other machines as well.

The machine 100 includes an upper swiveling body 102 supported on a ground engaging element 104. Although, the ground engaging element 104 is illustrated as continuous tracks, it should be contemplated that the ground engaging element 104 may be any other type of ground engaging element as well, for example, wheels etc. The machine 100 further includes a working mechanism 106 for conducting work, such as, for example, to excavate landsides or otherwise move material. The working mechanism 106 is an excavating mechanism including a boom 108, an arm 110, and a bucket 112, which serves as a front attachment. Additionally, the upper swiveling body 102 includes a counterweight 114 provided at a tail end.

Further referring to FIG. 1, the machine 100 includes an operator station 116 coupled to the upper swiveling body 102. The operator station 116 includes a display screen 118 and other levers or controls (not shown) for operating the machine 100. The machine 100 further includes an imaging device 120 including a plurality of imaging devices 120 generating image data (not shown), the plurality of imaging devices 120 positioned at spaced locations on the machine 100 so as to capture images of varying regions around the machine 100. In an embodiment, each of the image data may include a time stamp depicting a time at which the image data is being generated.

Each of the plurality of imaging devices 120 has an associated operating parameter. In an embodiment, the associated operating parameter may include an orientation of the plurality of imaging devices 120 relative to each other or the time at which the image data is generated or a quality of the image data. In some embodiments, the associated operating parameter may include both the orientation of the plurality of imaging devices 120 relative to each other and the quality of the image data. The illustrated orientations of the plurality of imaging devices 120 are described later in the disclosure. In some embodiments, each of the plurality of imaging devices 120 puts a time stamp in the image data being generated.

In the illustrated embodiment of FIG. 1, the plurality of imaging devices 120 include a first imaging device 120a, a second imaging device 120b, a third imaging device 120c, and a fourth imaging device 120d mounted on the upper swiveling body 102. The first imaging device 120a, the second imaging device 120b, the third imaging device 120c, and the fourth imaging device 120d may be referred to together as the imaging devices 120. In an embodiment, each of the plurality of imaging devices 120 may include cameras capable of capturing both still and moving images. In another exemplary embodiment, imaging devices 120 may each include smart cameras or smart vision systems having a dedicated processor on-board, including video processing acceleration provided by programmable state array (FPGA), digital signal processor (DSP), general purpose graphics processing unit (GP-GPU), or any other suitable microprocessor with supporting application software.

In the illustrated embodiment, the first imaging device 120a is installed adjacent the boom 108 and obtains images of a right-front side RFS of an environment E of the machine 100. The second imaging device 120b is installed at a position substantially in middle of the counterweight 114 and covers a back side BS of the upper swiveling body 102. Further, the third imaging device 120c is installed at a position behind the operator station 116 and upon the upper swiveling body 102 for obtaining images of a left side LS, and the fourth imaging device 120d is installed on a position opposite to the third imaging device 120c on the upper swiveling body 102 for obtaining images of a right side RS of the environment E of the machine 100. With the provision of the first imaging device 120a, the second imaging device 120b, the third imaging device 120c, and the fourth imaging device 120d, a view of substantially all sides around the machine 100 is generated.

Figure 2:
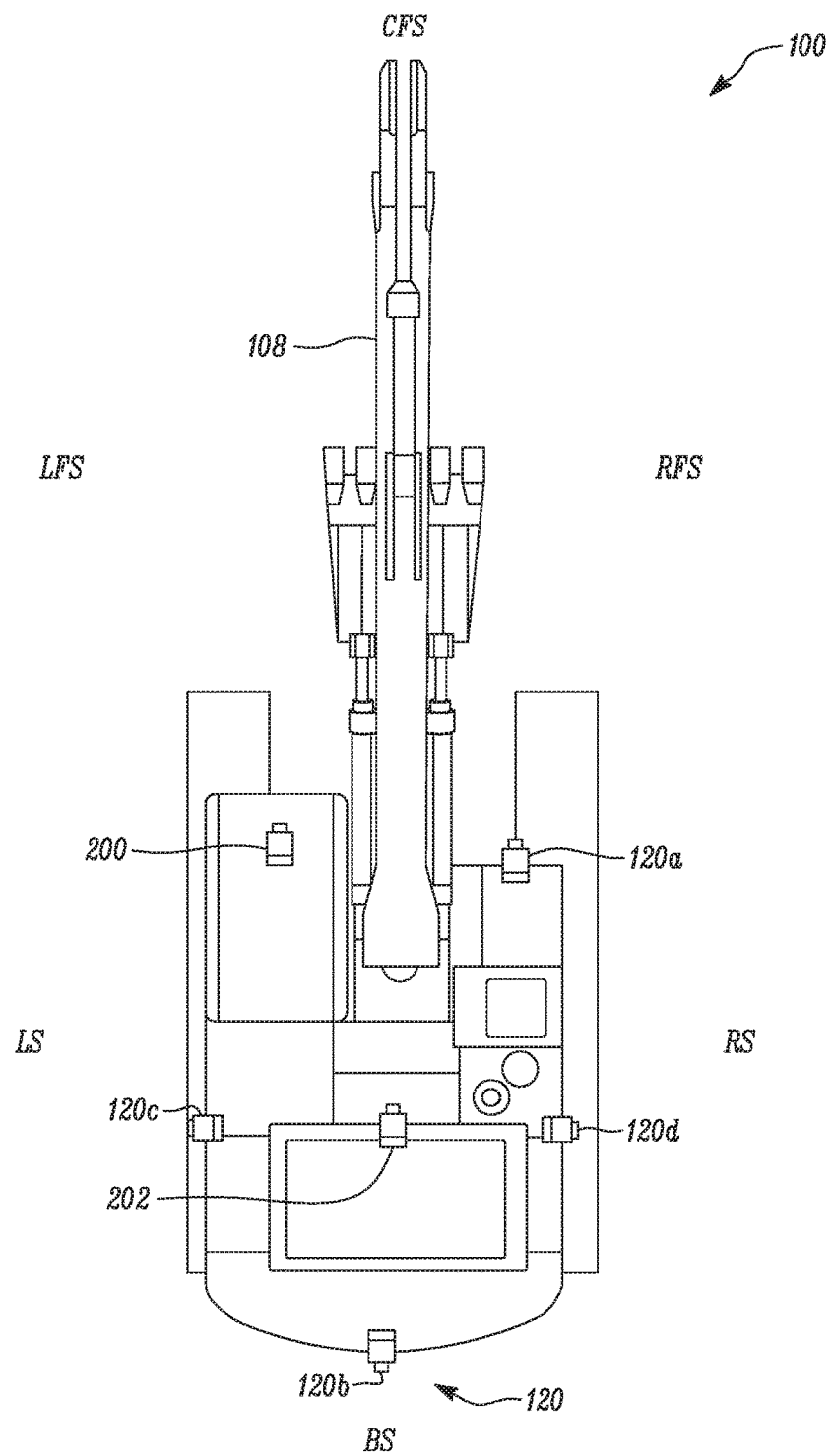
FIG. 2 is a top perspective view of the machine, in accordance with an embodiment of the present disclosure.

Moving on to FIG. 2, the plurality of imaging devices 120 further include a fifth imaging device 200 and a central imaging device 202. In the illustrated embodiment, the fifth imaging device 200 is installed above the operator station 116 and obtains images of a left-front side LFS of the environment E of the machine 100. Further, the central imaging device 202 is installed on a rear-side of the boom 108 for obtaining images of a central region of front side CFS of the machine 100. It should be contemplated that the positions of the imaging devices 120 are merely exemplary. Any other such combination of the positions of the imaging devices 120 may be used which may provide a complete view of the environment E of the machine 100.

The central imaging device 202 may be a smart camera with embedded digital processor on-board. The central imaging device 202 is communicably coupled to each of the plurality of imaging devices 120 and the display screen 118. In an embodiment, the obtained images of the first imaging device 120a, the fifth imaging device 200, and the central imaging device 202 may be combined together for providing additional visibility. Further, the central imaging device 202 may be used for combining together the obtained images.

Figure 3:
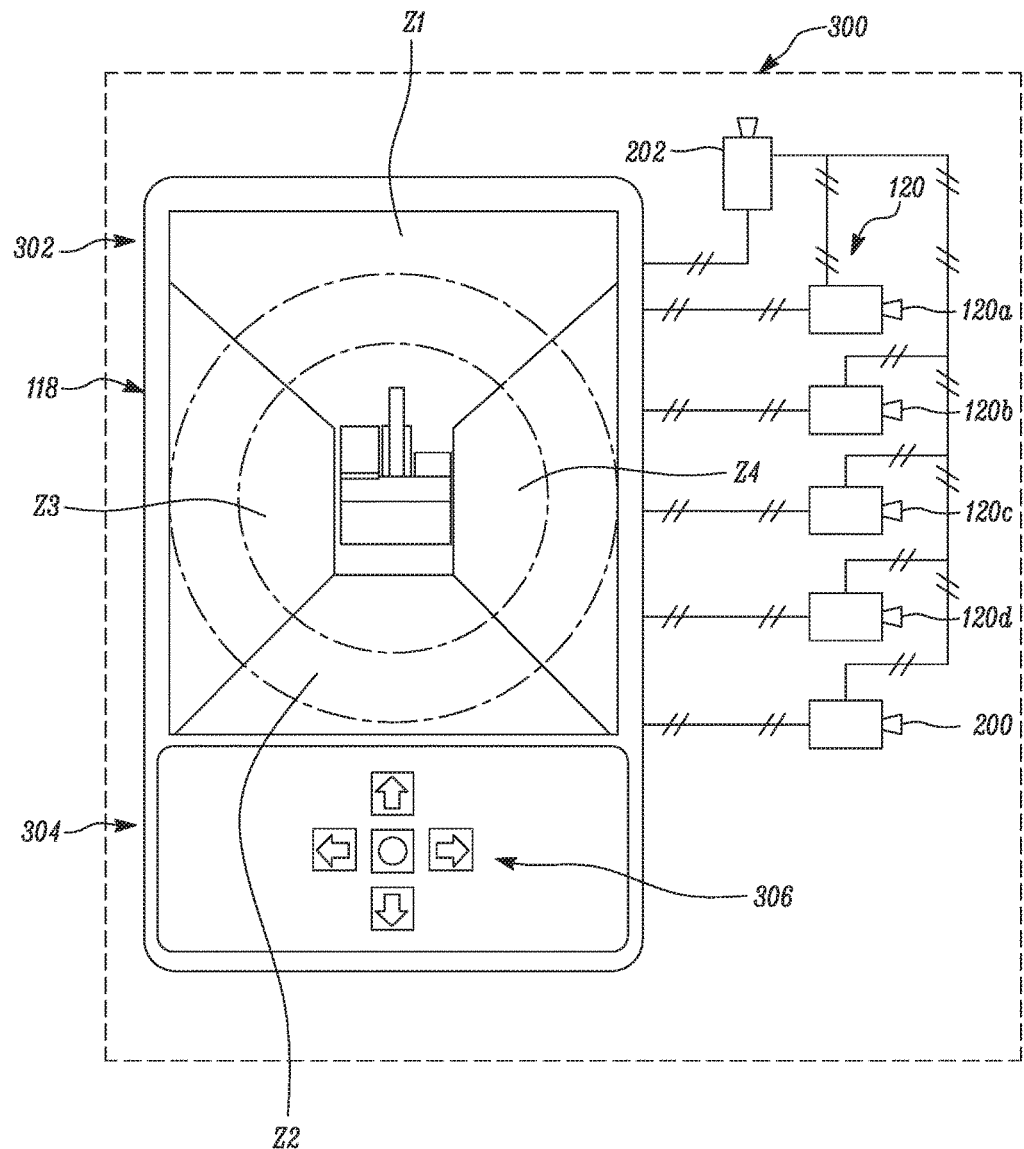
FIG. 3 is a schematic representation of the display system of the machine, in accordance with an embodiment of the present disclosure.

Referring to FIG. 3, a display system 300 is illustrated. The display system 300 includes the display screen 118 and the plurality of imaging devices 120. The display screen 118 includes a display section 302 and a control section 304. The display section 302 is capable of displaying digital images and can be controlled, via manual controllers 306 of the control section 304, or via touchscreen control of the display section 302, or via a combination of manual and touchscreen controllers. The display screen 118 is communicably coupled to the plurality of imaging devices 120. In an embodiment, the display screen 118 is communicably coupled to the imaging devices 120, the fifth imaging device 200, and the central imaging device 202 for receiving the respective image data.

As illustrated, the display section 302 is divided in a first zone Z1, a second zone Z2, a third zone Z3, and a fourth zone Z4. The first zone Z1 displays a first image data (not shown) generated as a first signal (not shown) from the first imaging device 120a. The first image data may be produced by merging image data from the captured images of the first imaging device 120a, the fifth imaging device 200, and the central imaging device 202. Similarly, the second zone Z2, the third zone Z3, and the fourth zone Z4 may display a second image data (not shown), a third image data (not shown), and a fourth image data (not shown) received from the second imaging device 120b, the third imaging device 120c, and the fourth imaging device 120d, respectively. The first image data, the second image data, the third image data, and the fourth image data are stored in an uncompressed form by the respective imaging devices. The central imaging device 202 may selectively compress the image data from the respective imaging devices 120 before communicating to the display screen 118. The display screen 118 may display the respective image data in the respective zones.

Figure 4:
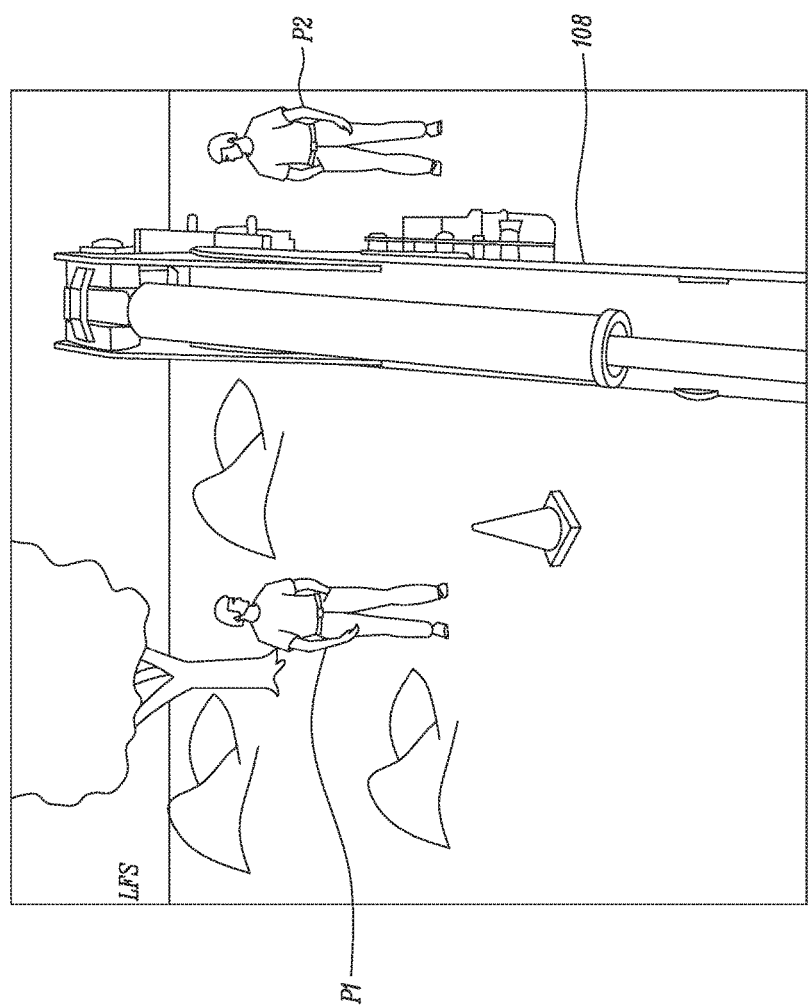
FIG. 4 depict an environment of the machine as captured from a left-front side camera, in accordance with an embodiment of the present disclosure.
Figure 5:
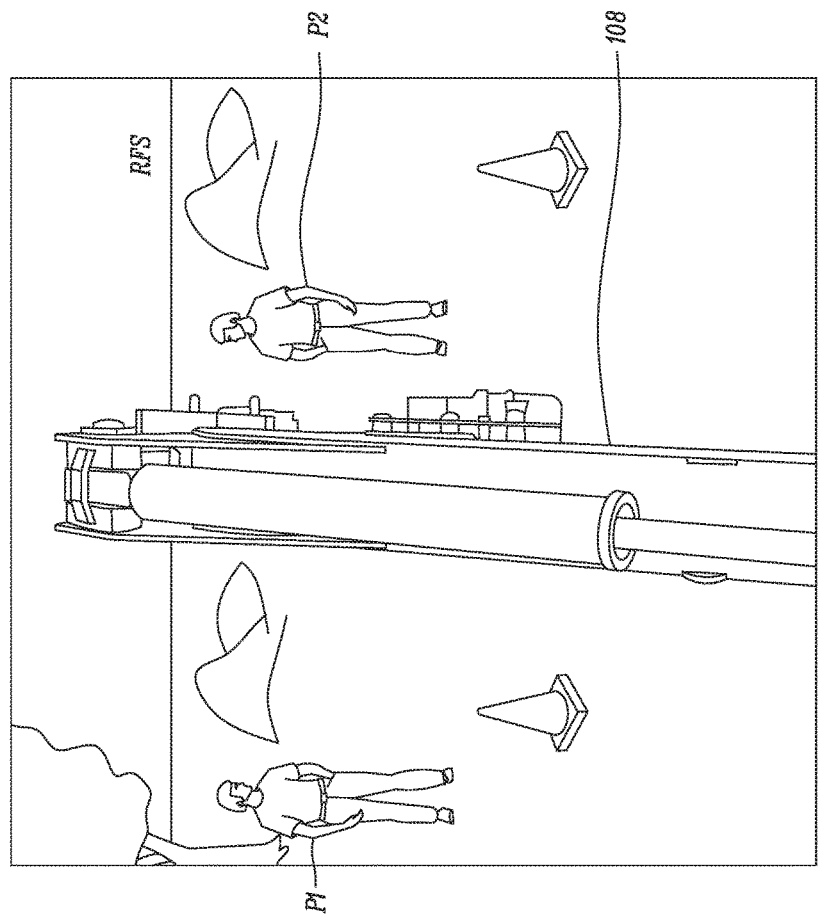
FIG. 5 depict an environment of the machine as captured from a right-front side camera, in accordance with an embodiment of the present disclosure.

FIG. 4 shows a view of the environment E of the machine 100 captured by the fifth imaging device 200, that is of the left-front side LFS of the environment E of the machine 100. A first person P1 is clearly visible on the left-hand side of the boom 108 while a second person P2 is obscurely visible on the right-hand side of the boom 108. In contrast, FIG. 5 displays a view of the environment E of the machine 100 captured by the first imaging device 120a, that is of the right-front side RFS of the environment E of the machine 100. The second person P2 is clearly visible on the right-hand side of the boom 108 while the first person P1 is obscurely visible on the left-hand side of the boom 108.

In an exemplary application, where the first person P1 is being tracked based upon an object detection technology or algorithm, already known in the art, the fifth imaging device 200 may hand-off all tracking characteristics associated with the first person P1 to the first imaging device 120a when the first person P1 is about to enter or enters a region covered by the first imaging device 120a. Similarly, in case where the second person P2 is being tracked based upon the object detection technology or algorithm, the first imaging device 120a may hand-off all tracking characteristics associated with the second person P2 to the fifth imaging device 200 when the second person P2 is about to enter or enters a region covered by the fifth imaging device 200. As the case may be, the first imaging device 120a or the fifth imaging device 200 may then transmit the image data to the display screen 118 based on the associated and received parameters of the fifth imaging device 200 or the first imaging device 120a, respectively.

Figure 6:
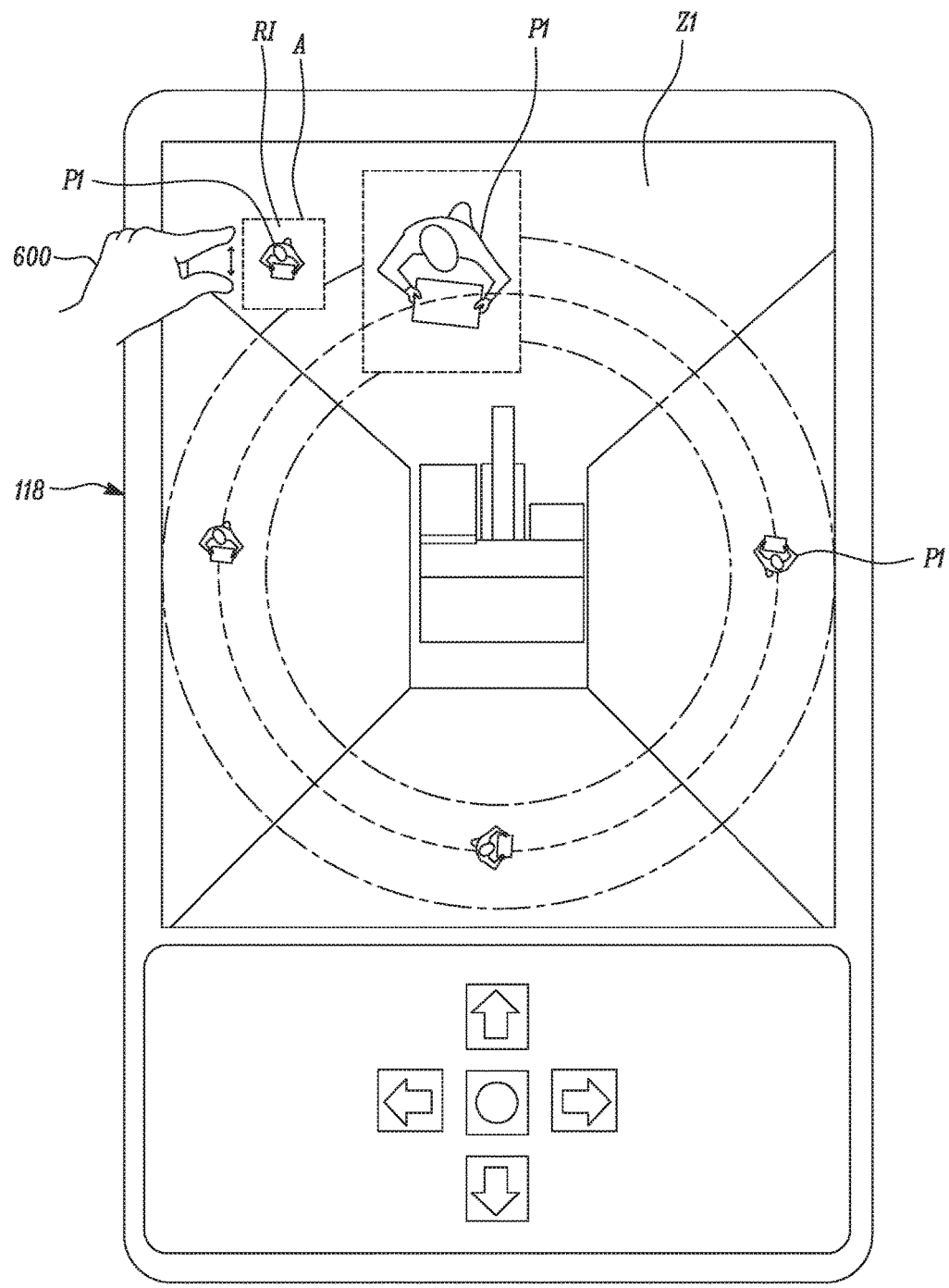
FIG. 6 is a front view showing a first configuration of the display system of the machine, in accordance with an embodiment of the present disclosure.

FIG. 6 shows the display screen 118 in a configuration where the first person P1 is being selected and tracked. In this configuration, the first zone Z1 includes the first person P1. The first zone Z1 also shows an area A selected on the display screen 118 by a hand 600 of a user (not shown), that is, a user input 600. The selected area A defines a region of interest RI having the person P1. The region of interest RI may include a plurality of region of interests RI spread across same or various zones. In another embodiment, the plurality of region of interests RI includes an associated priority rank (not shown) for each region of interest RI. The associated priority rank may be defined by a size (not shown) of corresponding region of interest RI.

On receiving the user input 600 at the display screen 118, the central imaging device 202 may send a signal to request the image data generated by the first imaging device 120a corresponding to the region of interest RI to the display screen 118 in an uncompressed form. In an embodiment, the first imaging device 120a or the central imaging device 202 may automatically identify the region of interest RI. In an embodiment where the plurality of region of interests RI are being considered, the associated priority ranks may be used to prioritize the image data before sending to the display screen 118. It may be contemplated that except selection by user input and an automatic selection by the central imaging device 202, the region of interest RI may be automatically selected by a controller (not shown) based upon the object detection technology or algorithm, used in the art. In an embodiment, the object detection technology or algorithms may include any technique of identifying objects in the captured image data.

Figure 7:
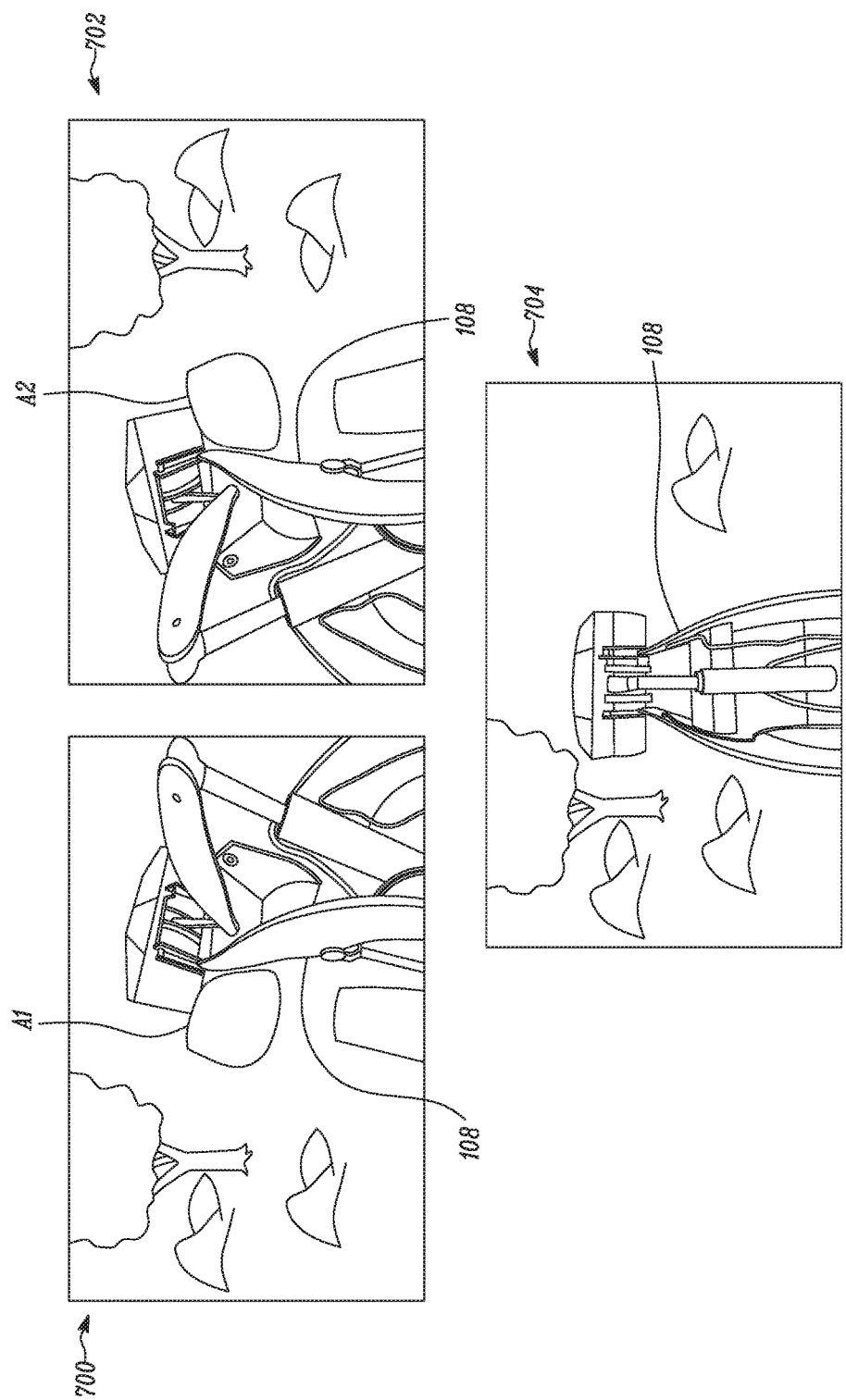
FIG. 7 depicts images captured from the left-front side camera, the right-front side camera, and a central region of front cameras, in accordance with an embodiment of the present disclosure.

FIG. 7 depicts a work tool visibility enabled machine 100 in various images. FIG. 7 includes a first image 700, a second image 702, and a third image 704. The first image 700 depicts a view of the environment E of the machine 100 captured by the fifth imaging device 200. A first area A1 is illustrated as selected by the controller for providing additional visibility based on the associated parameter of the fifth imaging device 200 and the received parameter of the central imaging device 202. Similarly, the second image 702 depicts a view of the environment E of the machine 100 captured by the first imaging device 120a. A second area A2 is illustrated as selected by the controller for providing additional visibility based on the associated parameter of the first imaging device 120a and the received parameter of the central imaging device 202. The third image 702 depicts a view captured by the central imaging device 202.

Figure 8:
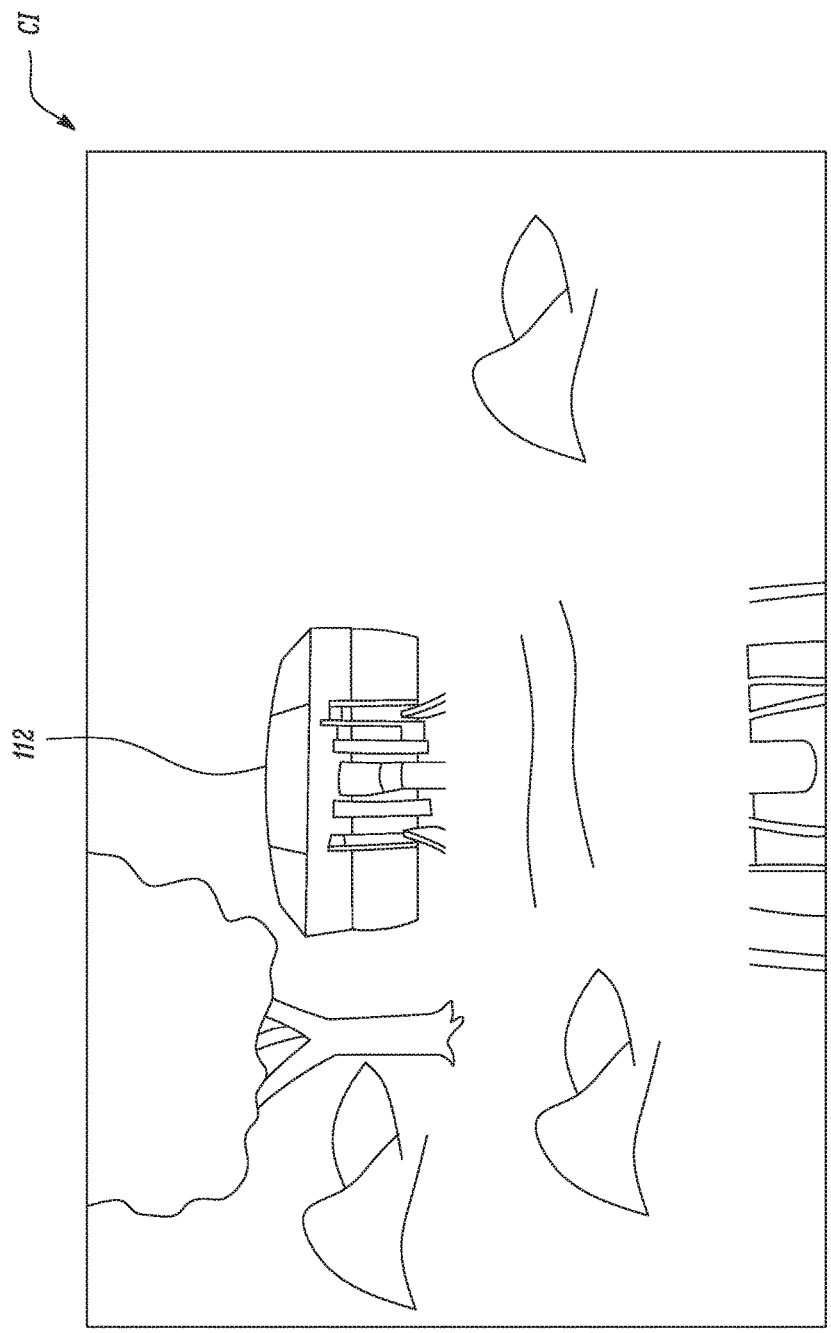
FIG. 8 illustrates a combined image made from joining the captured images from the left-front, the right-front, and the central region of front cameras, in accordance with an embodiment of the present disclosure.

As illustrated in FIG. 8, the first image 700 and the second image 702 are merged with the third image 704 for providing additional visibility. The first area A1 and the second area A2 are the additional visible regions in the respective images and are sent to the central imaging device 202 in a compressed or an uncompressed form for combining with the third image 704. The central imaging device 202 also transmits the merged image with compression of some image data to the display 118.

With combined reference to FIG. 1-8, the first imaging device 120a generates the first image data. The first imaging device 120a stores the generated first image data in the uncompressed form. The first imaging device 120a simultaneously compresses the first image data. In an embodiment, the first imaging device 120a transmits the compressed or the uncompressed first image data to the central imaging device 202.

The first imaging device 120a further generates the first signal indicative of the first image data. The first imaging device 120a or the central imaging device 202 sends the first image data to the display screen 118 over a data link (not shown) of the machine 100. The first person P1 is selected and being tracked based upon the object detection technology or algorithm and when the first person P1 migrates between multiple zones, the first imaging device 120a may hand-off all tracking characteristics associated with the first person P1 to the respective imaging device. Similarly, the first area A1 and the second area A2 are passed on to the central imaging device 202 in an uncompressed form being the region of interests RI. In some embodiments, the first area A1 and the second area A2 are passed on to the central imaging device 202 in a compressed form even after being the region of interest RI because of an exceptional bigger size of the region of interest RI. The uncompressed image data belonging to the first area A1 and the second area A2 are received and merged by the central imaging device 202 for providing work tool visibility.

In an embodiment where the plurality of region of interests RI are being considered, the associated priority ranks may be used to prioritize the data before sending to the display screen 118. In an embodiment, the first imaging device 120a, the second imaging device 120b, the third imaging device 120c, and the fourth imaging device 120d generate and communicate the first image data, the second image data, the third image data, and the fourth image data, respectively, to the first zone Z1, the second zone Z2, the third zone Z3, and the fourth zone Z4 of the display screen 118 for generating a surround-view image of the environment E of the machine 100.

INDUSTRIAL APPLICABILITY

Figure 9:
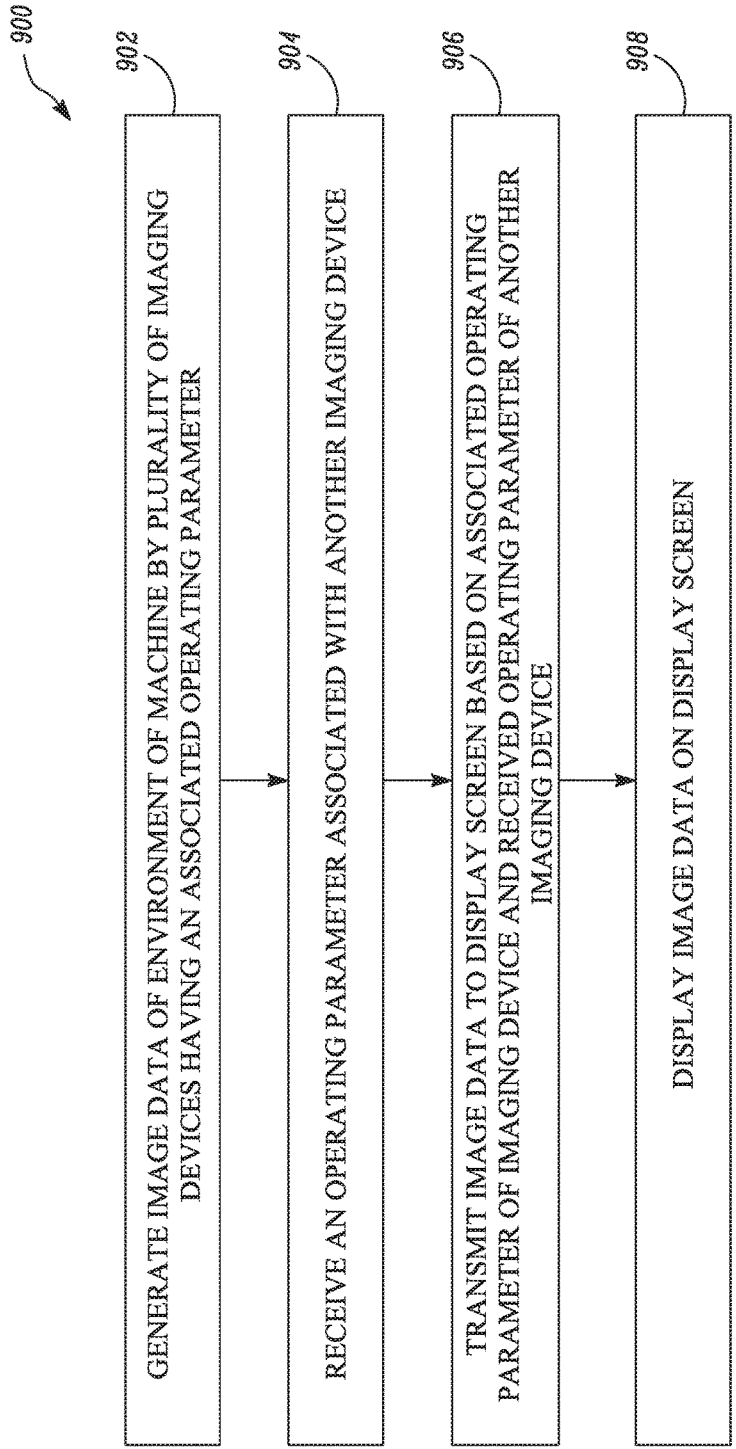
FIG. 9 is a flow chart depicting a method of displaying image data of an environment of a machine, in accordance with an embodiment of the present disclosure.

The present disclosure provides a method of displaying the image data of the environment E of the machine 100. A method 900 for displaying the image data is illustrated with the help of FIG. 9. In an embodiment, the machine 100 is switched on and is operating to excavate.

The method 900 at step 902 includes generating the image data of the environment E around the machine 100 by the plurality of imaging devices 120 having the respective associated operating parameter. In various embodiments, the associated operating parameter may include, for example, the orientation of the plurality of imaging devices 120 with respect to each other, quality of the images, and the time at which the image data is being generated etc. The method 900 at step 904 includes receiving the operating parameter associated with at least one another imaging device 120 from the plurality of imaging devices 120.

The method 900 at step 906 includes transmitting the image data to the display screen 118 over the data link of the machine 100 by the imaging device 120 based on the associated and received operating parameters. Selectively sending the image data based on the received and associated operating parameters improves the tracking of any personnel or object around the machine 100. Similarly, selectively handing-off the tracking characteristics from one imaging device 120 to another based on the associated or the received parameters, for example, the orientation of the plurality of imaging devices 120 relative to each other, the comparative quality of images captured by the plurality of imaging devices 120, and the time stamp etc., enables smooth transmission of the image data over the existing data link adhering to current system design requirements. The method 900 at step 908 includes displaying the image data at the display screen 118 over the data link of the machine 100 by the imaging device 120.

The method 900 may further include receiving the transmitted image data from the plurality of imaging devices 120 by the central imaging device 202. In an embodiment, the method 900 may include receiving the transmitted image data from the plurality of imaging devices 120 by the central imaging device 202. The method 900 may further include transmitting the image data corresponding to the region of interest RI in the compressed form to the display screen 118. The ability of the central imaging device 202 to handle a process such as on-board compression enables utilization of a cost-effective option for ECU and also enables retrofitting of the display system 300 in older machines without replacing the existing ECU with limited processing power and memory. The method 900 may also include transmitting the uncompressed image data to the display screen 118 by the central imaging device 202.

Additionally, the method 900 may include defining the associated parameters of the plurality of imaging devices 120 by the orientation of the imaging device 120 relative to the plurality of imaging devices 120. The associated parameters of the plurality of imaging devices 120 may be further defined by the image quality and the time at which the image data is being generated etc. The associated parameters of the plurality of imaging devices 120 may be also defined by both the orientation of each of the plurality of imaging devices 120 relative to every other, and the image quality. The use of the associated parameters like orientation, image quality, and time etc. enables selective transmission of the image data over the data link improving tracking, object or personnel detection, and work tool visibility, respectively.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A display system for displaying image data of an environment of a machine, the display system comprising:
a display screen; and
a plurality of imaging devices comprising:
a first imaging device; and
a second imaging device,
the second imaging device being communicably coupled to the first imaging device and the display screen, and
the second imaging device being configured to:
generate the image data;
receive, from the first imaging device, information identifying a first operating parameter associated with the first imaging device; and
selectively transmit, based on the first operating parameter and a second operating parameter associated with the second imaging device, signals indicative of the image data to the display screen.

2. The display system of claim 1,
where the second imaging device is a central imaging device, and
where the central imaging device is further configured to:
receive an image, of the environment, from the first imaging device.

3. The display system of claim 1, wherein the second imaging device is a smart camera with an embedded digital processor on-board.

4. The display system of claim 1, wherein the second operating parameter is image quality.

5. The display system of claim 1, wherein the second operating parameter is an orientation of the plurality of imaging devices relative to each other.

6. The display system of claim 1, wherein the second operating parameter is a time at which the image data is generated.

7. The display system of claim 1,
wherein the first imaging device is installed adjacent to a boom of the machine, and
wherein the second imaging device is installed on the boom.

8. A method comprising:
generating, by a plurality of imaging devices, image data of an environment of a machine,
the plurality of imaging devices including a first imaging device and a second imaging device;

receiving, by the second imaging device, information identifying a first operating parameter associated with the first imaging device;

identifying, by the second imaging device, a second operating parameter of the second imaging device; and selectively transmitting, by the second imaging device and based on the first operating parameter and the second operating parameter, the image data to a display screen.

9. The method of claim 8, wherein the second imaging device is a smart camera with an embedded digital processor on-board.

10. The method of claim 8, wherein the second operating parameter is an orientation of the plurality of imaging devices relative to each other.

11. The method of claim 8, wherein the second operating parameter includes an orientation of the plurality of imaging devices relative to each other and image quality.

12. The method of claim 8, wherein the second operating parameter is image quality.

13. The method of claim 8, wherein the second operating parameter is a time at which the image data is generated by the second imaging device.

14. The method of claim 8, further comprising:

handing-off, by the second imaging device, tracking characteristics, associated with a person, to the first imaging device when the person enters a region covered by the first imaging device.

15. A machine comprising:

an imaging device configured to:
    generate image data of an environment of the machine;
    selectively transmit, based on a first operating parameter of the imaging device and a second operating parameter of another imaging device, signals indicative of the image data; and a display screen, communicably coupled to the imaging device, configured to:
    receive, from the imaging device, the signals indicative of the image data; and
    display an image, on the display screen, based on the signals indicative of the image data.

16. The machine of claim 15, where the imaging device is further configured to:
    receive at least a portion of the image data from two or more other imaging devices.

17. The machine of claim 16, wherein the imaging device is a smart camera with an embedded digital processor on-board.

18. The machine of claim 15, wherein the first operating parameter is an orientation of the imaging device.

19. The machine of claim 15, wherein the first operating parameter is image quality.

20. The machine of claim 15, wherein the imaging device is further configured to:
    selectively hand-off tracking characteristics from the imaging device to the other imaging device based on the first operating parameter and the second operating parameter.

* * * * *